(12) United States Patent
Henderson et al.

(10) Patent No.: US 12,060,063 B2
(45) Date of Patent: Aug. 13, 2024

(54) METHOD FOR CONTROLLING WHEEL SLIP OF A VEHICLE

(71) Applicant: VOLVO TRUCK CORPORATION, Gothenburg (SE)

(72) Inventors: Leon Henderson, Härryda (SE); Leo Laine, Härryda (SE); Adithya Arikere, Gothenburg (SE); Sidhant Ray, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 334 days.

(21) Appl. No.: 17/453,773

(22) Filed: Nov. 5, 2021

(65) Prior Publication Data
US 2022/0153274 A1 May 19, 2022

(30) Foreign Application Priority Data
Nov. 16, 2020 (EP) .................................. 20207888

(51) Int. Cl.
*B60W 30/18* (2012.01)
*B60W 10/06* (2006.01)
(Continued)

(52) U.S. Cl.
CPC ...... *B60W 30/18172* (2013.01); *B60W 10/06* (2013.01); *B60W 10/08* (2013.01);
(Continued)

(58) Field of Classification Search
CPC ............. B60L 2200/36; B60L 2220/42; B60L 2240/423; B60L 2240/443;
(Continued)

(56) References Cited

U.S. PATENT DOCUMENTS 4,801,855 A * 1/1989 Nohmi ...................... B60L 3/10
388/903
9,527,406 B2 12/2016 Tang
(Continued)

FOREIGN PATENT DOCUMENTS

CN 106926750 A 7/2017
CN 111002974 A 4/2020
(Continued)

OTHER PUBLICATIONS

European Search Report dated May 12, 2021 in corresponding European Patent Application No. 20207888.7, 6 pages.

*Primary Examiner* — Carl C Staubach
(74) *Attorney, Agent, or Firm* — Venable LLP; Jeffri A. Kaminski

(57) ABSTRACT

A method for controlling wheel slip of a vehicle. The vehicle comprises at least a first and a second motion support device, MSD, for providing torque to a common wheel of the vehicle. The method comprises receiving a wheel torque request. Based on the received wheel torque request, the method further comprises controlling the first MSD to provide torque to the wheel in a first mode of operation, and controlling the second MSD to provide torque to the wheel in a second mode of operation which is different from the first mode of operation. The controlling of the first MSD and the controlling of the second MSD are, at least temporarily, performed simultaneously.

15 Claims, 6 Drawing Sheets

(51) Int. Cl.
*B60W 10/08* (2006.01)
*B60W 10/18* (2012.01)

(52) U.S. Cl.
CPC ......... *B60W 10/18* (2013.01); *B60W 2520/10* (2013.01); *B60W 2520/26* (2013.01); *B60W 2520/28* (2013.01); *B60W 2520/30* (2013.01); *B60W 2530/20* (2013.01); *B60W 2710/0644* (2013.01); *B60W 2710/081* (2013.01); *B60W 2720/28* (2013.01); *B60W 2720/30* (2013.01)

(58) Field of Classification Search
CPC ......... B60L 2240/461; B60L 2240/463; B60L 3/10; B60L 50/16; B60T 2270/604; B60T 8/175; B60T 8/17616; B60W 10/06; B60W 10/08; B60W 10/18; B60W 2520/10; B60W 2520/26; B60W 2520/28; B60W 2520/30; B60W 2530/20; B60W 2710/0644; B60W 2710/081; B60W 2720/28; B60W 2720/30; B60W 30/18172
See application file for complete search history.

(56) References Cited

U.S. PATENT DOCUMENTS

| | | | |
|---|---|---|---|
| 11,498,550 B2 * | 11/2022 | Watanabe | B60W 40/068 |
| 2001/0007965 A1 * | 7/2001 | Yokoyama | B60T 8/1755 180/197 |
| 2003/0154013 A1 * | 8/2003 | Ohtsu | B60K 23/0808 180/197 |
| 2013/0060440 A1 * | 3/2013 | Fukushiro | B60W 30/18127 701/70 |
| 2016/0016565 A1 * | 1/2016 | Gabor | B60L 15/2009 701/71 |
| 2016/0214486 A1 * | 7/2016 | Suzuki | B60L 50/52 |
| 2016/0368482 A1 * | 12/2016 | Shahverdi | B60W 20/13 |
| 2017/0137023 A1 * | 5/2017 | Anderson | B60W 10/20 |
| 2020/0039362 A1 | 2/2020 | Ronning et al. | |
| 2021/0387613 A1 * | 12/2021 | Laine | B60K 28/165 |
| 2022/0063575 A1 * | 3/2022 | Laine | B60T 8/172 |
| 2022/0135040 A1 * | 5/2022 | Arikere | B60W 40/101 701/22 |
| 2022/0161801 A1 * | 5/2022 | Arikere | B60W 10/08 |
| 2022/0315004 A1 * | 10/2022 | Bensch | B60W 10/184 |
| 2023/0063613 A1 * | 3/2023 | Gao | B60W 50/14 |
| 2023/0068987 A1 * | 3/2023 | Laine | B60L 3/104 |
| 2023/0150482 A1 * | 5/2023 | Prokes | B60G 17/0165 701/37 |
| 2023/0174079 A1 * | 6/2023 | Subramanian | B60T 8/92 701/1 |
| 2023/0242121 A1 * | 8/2023 | Salif | B60T 8/1764 701/70 |
| 2023/0339477 A1 * | 10/2023 | Laine | B60T 8/17616 |

FOREIGN PATENT DOCUMENTS

| | | |
|---|---|---|
| GB | 2562308 A | 11/2018 |
| KR | 102094859 B1 | 4/2020 |

* cited by examiner

METHOD FOR CONTROLLING WHEEL SLIP OF A VEHICLE

TECHNICAL FIELD

The present disclosure relates to a method for controlling wheel slip of a vehicle, wherein the vehicle comprises at least a first and a second motion support device, MSD, for providing torque to a common wheel of the vehicle. The disclosure also relates to a computer program, a computer readable medium, a control unit and a vehicle.

The invention can be applied in heavy-duty vehicles, such as trucks, buses and construction equipment. Although the invention will be described with respect to cargo transport vehicles such as semi-trailer vehicles and trucks, the invention is not restricted to this particular vehicle, but may also be used in other vehicles such as cars.

BACKGROUND

The braking system of a heavy duty vehicle is key to safe vehicle operation. The braking system not only limits vehicle velocity when needed, but also plays an important role in maintaining vehicle stability. For instance, if a left wheel of the vehicle runs over an icy area of the road, resulting in reduced friction and grip, while the corresponding right wheel runs on a non-slippery part of the road, then the braking system can be activated to compensate for and counteract the arisen slip situation.

A common approach for requesting a certain tyre force is to use torque control at the actuator level. However, such an approach has significant performance limitations. If a safety critical or excessive slip situation arises, then a relevant safety function (traction control, anti-lock brakes, etc.) steps in and requests a torque override in order to bring the slip back into control. A problem with this is that since the primary control of the actuator and the slip control are allocated to two different controllers, the latencies involved in the communication between them significantly limits the slip control performance.

A solution to the above approach may be to use a tyre model for converting a torque request into a wheel slip request. Thus, rather than to strive for a certain tyre force controlled at the actuator level, a faster control response may be obtainable by instead controlling the wheel slip, i.e. the rotational speed of the wheel. However, when multiple actuators act on the same wheel, also wheel slip requests may present problems. One example of such a problem may be on an axle that is connected to an electric machine and a friction brake. Another example is an axle where multiple electric machines (e.g. electric motors) are connected in parallel to the same axle. In these cases if a wheel slip request is to be followed, the allocation of requests between the multiple actuators must be done in a way that "fighting" between the actuators is avoided. For examples, if the three electric machines connected to the drive axle of the vehicle are simply all set to a motor speed request (corresponding to the requested wheel slip) it is very likely that the three electric machines would interfere with each other when the motor speed(s) come close to the target value. Thus, it would be desirable to use wheel slip control when multiple actuators act on a common wheel, wherein the above described drawbacks are at least partly mitigated.

SUMMARY

An object of the invention is to provide a method which alleviates the drawbacks of the prior art. This and other objects, which will become apparent in the following disclosure, are achieved by a method as defined in the accompanying independent claim.

The present inventive concept is based on the realization that when two or more motion support devices, MSDs, (such as the above or other mentioned actuator combinations) are configured to provide torque to a common wheel of the vehicle (or to a common group of wheels, such as providing torque on an axle level), then the fighting/interfering between the MSDs may be avoided by controlling the MSDs to provide torque in a at least two different modes of operation. Thus, one or more MSDs may be controlled to provide torque in a first mode of operation, while the other MSD(s) may be controlled to provide torque in a second and/or further mode of the operation. For instance, one MSD may be controlled in a master mode of operation, while the other MSD(s) may be controlled in a slave mode of operation which is dependent on the master mode of operation. Different aspects and exemplary embodiments will be discussed in the following.

According to a first aspect of the present disclosure, there is provided a method for controlling wheel slip of a vehicle, wherein the vehicle comprises at least a first and a second motion support device, MSD, for providing torque to a common wheel of the vehicle, the method comprising:
receiving a wheel torque request,
based on the received wheel torque request:
controlling the first MSD to provide torque to the wheel in a first mode of operation,
controlling the second MSD to provide torque to the wheel in a second mode of operation which is different from the first mode of operation,
wherein said controlling of the first MSD and said controlling of the second MSD are, at least temporarily, performed simultaneously.

By having the first MSD and the second MSD provide torque in different modes of operation, even though performed simultaneously, the risk of interfering may be avoided when the MSDs come close to their target values associated with the received wheel torque request. There may be some other advantages, such that a more precise slip and torque control may be achieved at a given wheel simultaneously, and that a more precise slip control may be achieved while also achieving a desired distribution of torque and/or power across the MSDs providing energy efficiency improvements, reduced strain on individual MSDs etc.

The method presented in this disclosure may suitably be performed in an autonomous vehicle or in a driver-operated vehicle.

The inventive concept is not limited to only two MSDs, but may advantageously be implemented for three or more MSDs providing torque to a common wheel, or to a common group of wheels (such as on a common axle). The two or more MSDs may be of the same type, or of different types. Examples of conceivable MSDs that may be controlled in accordance with the present disclosure, include electric machines, such as electric motors; internal combustion engines, ICE; and friction brakes.

According to at least one exemplary embodiment, said first mode of operation is a speed control mode, wherein the method comprises sending a wheel speed request to the first MSD for controlling the rotational speed of the wheel. By applying a speed control mode, a fast and accurate slip control is achievable. Such speed control mode may be implemented for various types of MSDs, including electric machines, ICEs and friction brakes. The two former are exemplified in the following exemplary embodiment.

According to at least one exemplary embodiment, the first MSD is an electric machine or an internal combustion engine, ICE, wherein said first mode of operation is a speed control mode, wherein the method comprises sending a machine speed request to the first MSD for controlling the rotational speed of the first MSD. As above, this allows a fast and accurate slip control.

Thus, from the above it should be understood that the rotational speed of the machine itself may be controlled, or the rotational speed of the actual wheel may be controlled. The rotational speed of the machine may be different to the wheel speed (due to a gear box inbetween, etc.). An advantage of controlling the machine speed is where the MSD is a motor (such as electrical or ICE) that may be connected via shafts to the wheel. This is because the wheel speed signal may have some latency and or phase difference to the machine speed due to drive shaft stiffnesses, etc. Therefore, a control loop based on the machine speed may be more stable than a control loop based on the wheel speed.

According to at least one exemplary embodiment, said second mode of operation is a torque control mode, wherein the method comprises sending a torque request to the second MSD for controlling the torque of the second MSD. By controlling the first MSD to provide torque in a speed control mode, and controlling the second MSD to provide torque in a torque control mode, the risk of the MSDs fighting each other may be reduced. Furthermore, the response times may suitably be different. For instance, the speed control mode may have a faster control response time than the torque control mode.

According to at least one exemplary embodiment, the wheel is provided with a tyre for which a tyre model is provided, wherein, in the tyre model, longitudinal tyre force is represented as at least a function of longitudinal wheel slip, longitudinal wheel slip being dependent on rotational speed of the wheel and velocity of the vehicle, wherein the method comprises controlling the rotational speed based on said tyre model. Thus, a tyre model may advantageously be used to transform a torque request into a wheel slip request or a speed request. Thus, according to present disclosure, torque control latency may be avoided by providing the torque control at the same vehicle sub-system as the slip control. Such sub-systems have relatively short response times compared to the vehicle control unit from which torque requests are traditionally sent. By using a tyre model in which a longitudinal tyre force is a function of at least the longitudinal wheel slip, a slip control sub-system can be used to provide a slip request which corresponds to a desired longitudinal force. Hereby, a fast response time is obtained.

It should be understood that although the tyre model, in its most basic form may be the longitudinal tyre force represented as only a function of longitudinal wheel slip, in at least some exemplary embodiments, other variables may also be included in the tyre model. For instance, the tyre model may also include other inputs, such as lateral wheel slip, vertical force on the tyre, etc.

It should also be understood that other exemplary embodiments may be implemented without a tyre model. For instance, the first MSD may be set in speed control mode with a speed calculated based on a longitudinal slip value (which may be constant or varied). In the case of a constant slip value being used that MSD would be trying to get to the maximum traction (or braking) setting, but would often be limited by the torque limitation that is also sent to the MSD. This is a simplified approach which does not require a tyre model, although exemplary embodiments with tyre models may be more accurate.

The longitudinal wheel slip may be a positive wheel slip or a negative wheel slip. During for instance acceleration, a positive propulsion slip may be obtained, i.e. the product of the rotational speed of the wheel and its radius is larger than the velocity of the vehicle in the direction of the wheel. During braking, a negative slip may be obtained, i.e. the product of the rotational speed of the wheel and its radius is lower than the velocity of the vehicle in the direction of the wheel.

The longitudinal wheel slip may be a positive wheel slip or a negative wheel slip. During for instance acceleration, a positive propulsion slip may be obtained, i.e. the product of the rotational speed of the wheel and its radius is larger than the velocity of the vehicle in the direction of the wheel. During braking, a negative slip may be obtained, i.e. the product of the rotational speed of the wheel and its radius is lower than the velocity of the vehicle in the direction of the wheel.

According to at least one exemplary embodiment, in its conversion of the wheel torque request to the wheel rotational speed request, the control unit is configured to calculate a slip request based on the corrected function and to transform the slip request to the wheel rotational speed request using the slip formula:

$$\lambda = \frac{R\omega - v_x}{\max(|R\omega|, |v_x|)}$$

where $\lambda$ is the longitudinal wheel slip, where $R\omega$ is the rotational speed of the wheel, of which R is the wheel radius in meters and $\omega$ is the angular velocity of the wheel, and where $v_x$, is the longitudinal speed of the wheel. Thus, the wheel rotational speed request is conveniently obtainable from the formula and the function of the tyre model.

Thus, $\lambda$ is bounded between −1 and 1 and quantifies how much the wheel is slipping with respect to the road surface. The control unit may suitably maintain information on $v_x$, (in the reference frame of the wheel), while a wheel speed sensor may be used to determine $\omega$.

According to at least one exemplary embodiment, the method further comprises
  converting the received wheel torque request to a wheel rotational speed request based on the tyre model,
  initially only controlling the first MSD, such that a rotational speed of the wheel corresponding to the wheel rotational speed request is obtained or such that the achieved rotational speed on the first MSD does not reach the wheel rotational speed request and the applied torque is below a specified torque limit, thereafter
  summarizing the values of a selected control parameter present at the MSDs to obtain a summed value,
  dividing the summed value between the MSDs based on a desired value split to assign a share of the summed value to the second MSD, and
  sending a parameter request to the second MSD corresponding to its share of the summed value, while the first MSD remains controlled in speed control mode.

Thus, the first MSD set to speed control mode "leads" the other MSDs. After a period of time (which is suitably long enough for a quasi-steady state to be reached between the first MSD and the wheel and road) the values of said selected control parameter is summed and then divided. It may be divided equally, but other rules may be applied in which each MSD receives its share of the summed value. It should be noted that the method does not need to necessarily wait for the first MSD to reach the target speed. Rather long enough time is allowed to pass so that the current applied torque on the first MSD does not exceed the speed request. For instance, there may be cases (on a dry road) where the first MSD will not reach the target speed at all, but the other MSD(s) should still (eventually) add torque to bring the overall wheel speed as close as possible to the target, or such that the total torque reaches a limit value.

It should also be understood that the received wheel rotational speed request may be met by controlling the rotational speed of the wheel or by controlling the rotational speed of the first MSD itself (any gear ratio etc. between the rotational speeds may thus be included in calculations and the conversion of the wheel torque request into the wheel rotational speed request).

The above selected control parameter may for instance be torque or power. This is reflected in the below disclosed exemplary embodiments.

According to at least one exemplary embodiment, said selected control parameter is torque, wherein said summarizing, dividing and sending comprises:
    summarizing the current torques present at the MSDs to obtain a summed value,
    dividing the summed value between the MSDs based on a desired torque split to assign a share of the summed value to the second MSD, and
    sending a torque request to the second MSD corresponding to its share of the summed value, while the first MSD remains controlled in speed control mode.

The advantages are analogous to the above general disclosure of a control parameter.

According to at last one exemplary embodiment, said selected control parameter is power, wherein said summarizing, dividing and sending comprises:
    summarizing the current powers delivered by the MSDs to obtain a summed value,
    dividing the summed value between the MSDs based on a desired power split to assign a share of the summed value to the second MSD, and
    sending a power request to the second MSD corresponding to its share of the summed value, while the first MSD remains controlled in speed control mode.

The advantages are analogous to the above general disclosure of a control parameter.

According to at least one exemplary embodiment, the method comprises, after a period of time, repeating said sequence of summarizing the values (e.g. torque or power), dividing the summed values, and sending a parameter request (e.g. torque request or power request) to the second MSD. Thus, the MSDs may be sent parameter requests based on their share of the total status. Time is allowed for the system to stabilise again, then the parameter statuses are read again and the sequence is repeated. If more than two MSDs act on the same wheel, for instance, three MSDs, than the first MSD may be operated in speed control mode, and the second and third MSDs may be controlled based on their share of the summed selected parameter value. When three MSDs are provided, the parameter split may be divided by three (however, other rules may be applied).

According to at least one exemplary embodiment, the method comprises dividing the value of the received wheel torque request between the first and the second MSDs based on a desired torque split, wherein said second mode of operation is a torque control mode, wherein the method comprises sending a torque request to the second MSD, wherein the first mode of operation is a speed control mode, wherein the method comprises sending a machine speed request to the first MSD, which machine speed request is selected based on the tyre model so as to provide the total value of the received wheel torque request. The dividing may be made based on a preferred torque split, i.e. the requested torque is not necessarily evenly divided. By dividing the value of the requested torque between the two or more MSDs, but letting one of MSDs work in speed control mode, while the other(s) work in torque control mode, fighting between the MSDs may be avoided. The one or more MSD:s that are in torque control mode may be regarded as providing a relatively rough baseline, while the first MSD (which is in speed control mode) may be regarded as providing the fine tuning for attaining the desired slip associated with the received wheel torque request. It should be noted that in this exemplary embodiment, the speed control mode does not necessarily need to have a faster response control loop than then torque control mode. The response time may thus be the same for both MSDs in this exemplary embodiment.

According to at least one exemplary embodiment, said second mode of operation is a speed control mode which is different from the speed control mode of the first MSD, wherein the method comprises configuring the first MSD as a high bandwidth MSD having relatively short response time control loop(s), and configuring the second MSD as a low bandwidth MSD having relatively long response time control loop(s). By setting different response time control loop(s) the MSDs will not interfere with one another. Thus, the second MSD may be used for performing a coarse speed control, while the first MSD may be used for performing a fine resolution speed control. Thus, by picking relevant tuning parameters in an appropriate way, the two or more MSDs may have the same speed target without causing undesirable chattering and/or fighting between the MSDs. Apart from the bandwidth, a possible tuning parameters may be to select a tight or large deadzone. This is reflected in the following exemplary embodiment.

According to at least one exemplary embodiment, the method comprises configuring the first MSD with a relatively tight deadzone allowing the rotational speed of the first MSD to deviate from the requested rotational speed by a relatively small value before correcting the rotational speed, and configuring the second MSD with a relatively large deadzone allowing the rotational speed of the second MSD to deviate from the requested speed by a relatively large value before correcting the rotational speed. Thus, setting the second MSD to perform a coarse speed control and setting the first MSD to perform a fine resolution speed control, fighting between the MSDs may be avoided.

Thus, from the above it should be understood that the first mode of operation and the second mode of operation may in some exemplary embodiment be different in that different parameters are controlled (e.g. speed control versus torque or power control), and may in other exemplary embodiments be different in that the operating ranges are different although the same control parameter is implemented (e.g. speed control with fast control bandwidth and/or tight deadzone versus speed control with low control bandwidth and/or large deadzone).

As have been mentioned various times in this disclosure, there may be more than two MSDs acting on the same wheel or on the same group of wheels. This is reflected in at least one exemplary embodiment, according to which the vehicle comprises a third MSD, for providing torque to said wheel, the method comprising controlling the third MSD in said second mode of operation, or in a third mode of operation which is different from the first and second modes of operation. Thus, in general, if there are three or more MSDs, the advantageous effects of avoiding fighting between the MSDs is obtainable even though the second and the third MSDs are controlled with the same mode of operation. For instance, the first MSD may be operated in speed control mode, and the second and third MSDs may be operated in torque control modes, in accordance with their share of a torque split. In some exemplary embodiments, the first MSD may be regarded as the master MSD, while the second and third MSDs may both be regarded as slave MSDs. Although the second and third MSDs may be controlled in the same mode of operation, in some exemplary embodiments they may be controlled in different modes of operation. For instance, in embodiments in which all MSDs are set to speed control modes, the first MSD may be set with a tight deadzone and fast control bandwidth, the second MSD may be set with an intermediate deadzone and a moderate control bandwidth, and the third MSD may be set with a large deadzone and a low control bandwidth.

It should be understood that in at least some exemplary embodiments the control modes for the different MSD:s may be switched over time. For instance, a specific MSD that is put in speed control could, over time, be swapped between available MSDs (e.g. if you have multiple identical electric machines, you could let them take turns at being the lead MSD).

According to a second aspect of the present disclosure, there is provided a computer program comprising program code means for performing the method according to the first aspect, including any embodiments thereof, when said program is run on a computer. The advantages of the computer program of the second aspect largely correspond to those of the first aspect, including any embodiments thereof.

According to a third aspect of the present disclosure, there is provided a computer readable medium carrying a computer program comprising program code means for performing the method according to the first aspect, including any embodiments thereof, when said program product is run on a computer. The advantages of the computer readable medium of the third aspect largely correspond to the advantages of the first aspect, including any embodiments thereof.

According to a fourth aspect of the present disclosure, there is provided a control unit for controlling wheel slip of a vehicle, wherein the vehicle comprises at least a first and a second motion support device, MSD, for providing torque to a common wheel of the vehicle, the control unit being configured to perform the method according to the first aspect. The advantages of the control unit of the fourth aspect largely correspond to the advantages of the first aspect, including any embodiments thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to a fifth aspect of the present disclosure, there is provided a vehicle comprising a control unit according to the fourth aspect wherein said first MSD is one of an electric machine, an ICE, and a brake actuator, wherein said second MSD is one of an electric machine and a brake actuator. The advantages of the vehicle of the fifth aspect largely correspond to the advantages of the first aspect, including any embodiments thereof. Some exemplary embodiments (but not exhaustive) embodiments, include the following combinations of MSDs:

Coordinating multiple electric machines connected to one wheel or group of wheels.
Coordinating one or more electric machines and one or more brake actuators (e.g. friction brakes) connected to one wheel or group of wheels.
Coordinating one or more electric machines and one or more ICEs connected to one wheel or group of wheels.
Coordinating one or more ICEs and one or more brake actuators connected to one wheel or group of wheels.
Coordinating one or more electric machines and one or more ICEs and one or more brake actuators connected to one wheel or group of wheels.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
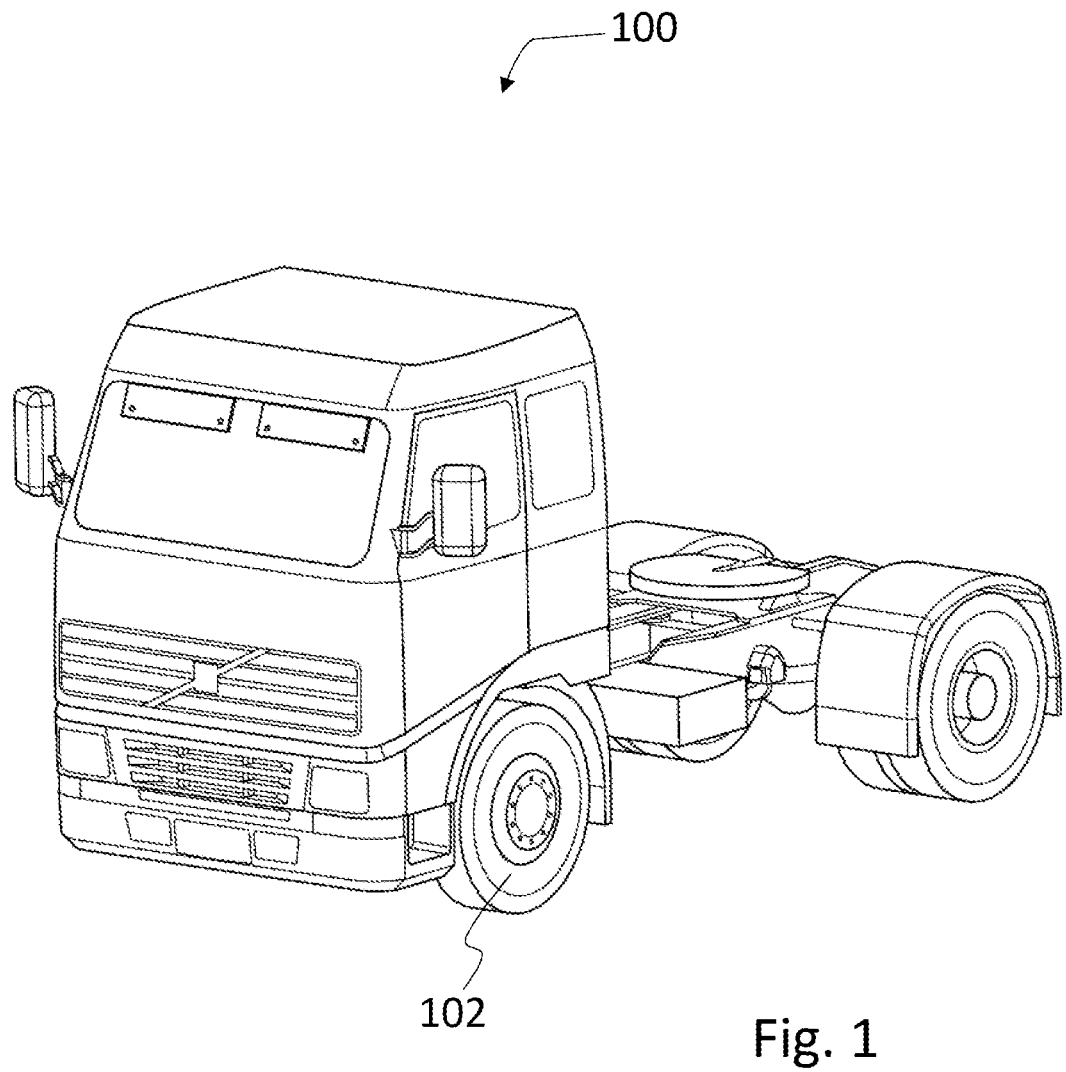
FIG. 1 illustrates a vehicle according to at least one exemplary embodiment of the invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 100 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc. It should furthermore be understood that the inventive concept is not limited to heavy duty vehicles, but may also be implemented in other vehicles, such as cars.

The illustrated vehicle 100 is supported on wheels 102, some of which are driven wheels. Although the vehicle 100 in FIG. 1 only has four wheels 102, the inventive concept is applicable to vehicles having more wheels, such as in the above-mentioned different types of vehicles.

Each wheel 102, or at least a majority of the wheels, is associated with a respective wheel brake. This wheel brake may, e.g. be a pneumatically actuated disc brake or drum brake, but some aspects of the disclosure are also applicable to regenerative brakes which produce electrical power during vehicle retardation, and electrical machines able to slow down wheel rotational velocity upon request. The wheel brakes are controlled by a wheel end module (WEM), which may control applied braking force on at least one wheel 102 of a vehicle such as the vehicle 100 in FIG. 1. Each WEM is communicatively coupled to a control unit (not shown in FIG. 1), allowing the control unit to communicate with the WEM and thereby control vehicle braking. This control unit may potentially comprise a number of sub-units distributed across the vehicle 100, or it may be a single physical unit. The control unit may e.g. allocate brake force between wheels to maintain vehicle stability.

It should be noted that in other exemplary embodiments, instead of, or in addition to having WEMs, there may be provided an axial control module (ACM). For instance, an ACM may be implemented in cases where the axle includes a machine that operates through a differential. Thus, although for simplicity, WEM will be discussed in connection with the description of the drawings, it should be understood that the corresponding functionality may be implemented by an ACM.

Each driven wheel 102 may be driven by a suitable electrical machine (such as an electrical motor, a combined motor/generator, etc.) or by an internal combustion engine, ICE, or a combination thereof. The electrical machine and/or ICE may drive more than one wheel, e.g. working across an open differential. In other exemplary embodiments, each driven wheel may be propelled by an individually associated electrical machine. In either case, the above-mentioned control unit may suitably be communicatively coupled to such electrical machines for allocating the propulsion force between wheels. A more detailed discussion of the above-discussed a control unit will follow in connection to the presentation of FIGS. 3 and 4.

As has been discussed in the Summary section of this disclosure, the general inventive concept concerns controlling wheel slip of a vehicle by controlling a first motion support device, MSD, to provide torque to the wheel in a first mode of operation, while controlling the second MSD to provide torque to the wheel in a second mode of operation which is different from the first mode of operation. Examples of configurations of motion support devices, MSDs, will now be discussed in connection with FIG. 2.

Figure 2:
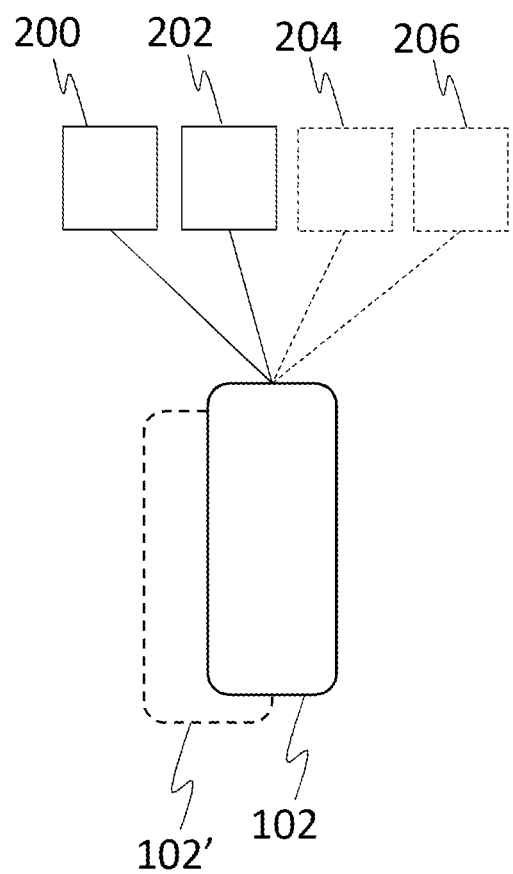
FIG. 2 schematically illustrates some configurations in which the present invention may be implemented.

FIG. 2 schematically illustrates some configurations in which the present invention may be implemented. As illustrated with solid lines, the present disclosure envisages controlling at least two MSDs 200, 202 which act on the same wheel 102. However, as illustrated with dashed lines, there may be more MSDs 204, 206 acting on the same wheel 102 (in the drawing four MSDs are illustrated, however, it should be understood that the number of MSDs could be three, five or more). Furthermore, as illustrated with dashed line, there may be at least one further wheel 102' on which the MSDs 202-206 act. Thus, the MSDs 202-206 may in some exemplary embodiments act on the same group of wheels 102, 102'. A vehicle for which the present inventive concept may be implemented, such as the vehicle 100 in FIG. 1, may for instance have one or more MSDs 202-206 in the form of electric machines, in the form of ICEs, and/or in the form of brake actuators, which act on a common wheel 102 or a common group of wheels 102, 102'. Thus, some examples of combinations may be MSDs in the form of:

Two or more electric machines.
One or more electric machines and one or more brake actuators (e.g. friction brakes).
One or more electric machines and one or more ICEs.
One or more ICEs and one or more brake actuators.
One or more electric machines and one or more ICEs and one or more brake actuators.

Figure 3:
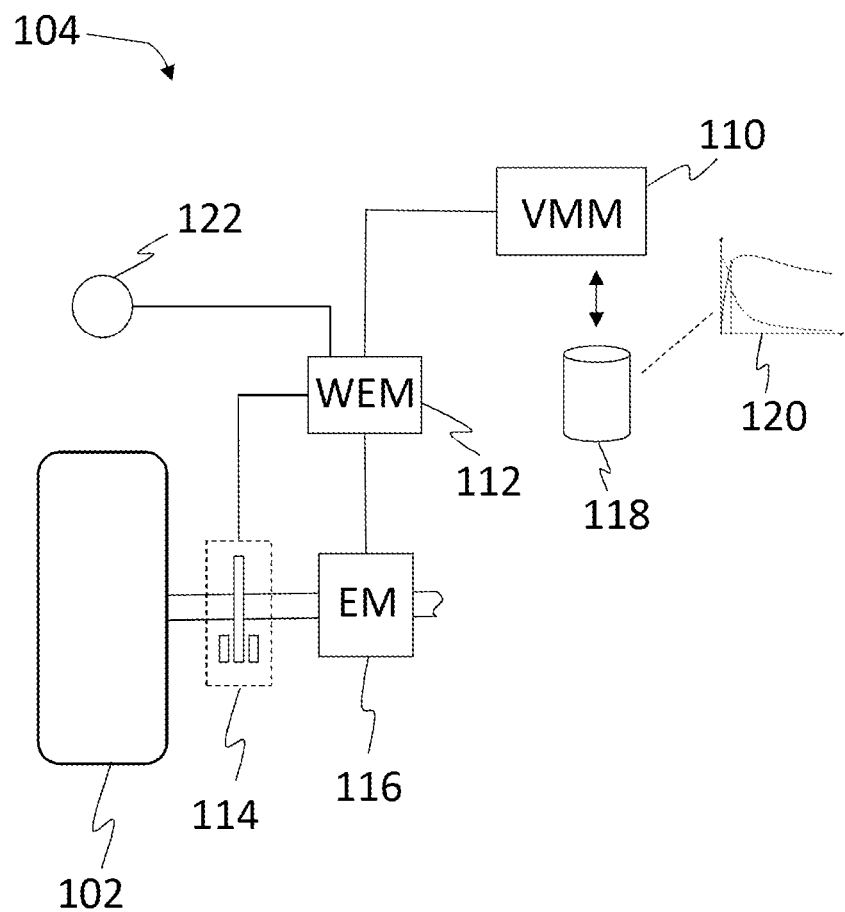
FIG. 3 illustrates a control system in which a control unit according to at least one exemplary embodiment of the invention has been included.

FIG. 3 illustrates a control system 104 in which a control unit 110 according to at least one exemplary embodiment of the invention has been included. The control unit 110 may perform the inventive method discussed in this disclosure.

More specifically, in FIG. 3, there is illustrated a control system 104 for a wheel 102, here exemplified by the vehicle front axle left wheel. A wheel end module (WEM) 112 is arranged to control the wheel braking by a brake actuator 114, i.e. a part of the brake system, here exemplified by a disc brake. As mentioned above, the WEM 112, may be replaced by or complemented by an axle control module (ACM). The brake system may also comprise one or more electric machines (EM) 116, and/or combinations of different brake actuators. The illustrated electric machine 116 may also be controlled to provide a propulsion force to the wheel 102. The exemplified electric machine 116 may thus represents a first motion support device, MSD 116, and the exemplified brake actuator 114 may represent a second motion support device, MSD 114, or vice versa.

The WEM 112 is communicatively coupled to the control unit 110, e.g. a vehicle motion management (VMM) system. Although the WEM 112 and the VMM 110 have been illustrated as two functionally separate entities, it should be understood that they may be structurally provided as one common entity. Thus, in some exemplary embodiments the WEM 112 and the VMM 110 are provided as one unit. In other exemplary embodiments, the WEM 112 and the VMM 110 may be structurally separated. It should also be understood that the VMM 110 may be distributed over several structural entities, some of which may be remote, e.g.

off-board. For instance, some functionalities, such as calculations made by the VMM 110 may be cloud-based, wherein part of the VMM 110 may be provided at one or more remote servers, etc.

The control unit 110, here embodied as the VMM 110, may comprise or be operatively connected to a data storage 118. The data storage 118 may thus be on-board the vehicle or off-board. FIG. 3 schematically illustrates a graph to depict that the data storage 118 may have a stored tyre model 120 for the tyre of the wheel 102. As will be discussed in more detail in connection with FIG. 5, in the tyre model 120, longitudinal tyre force is represented as at least a function of longitudinal wheel slip. Longitudinal wheel slip is dependent on the rotational speed of the wheel 102 and the velocity of the vehicle. The rotational speed of the wheel 102 may be measured by a speed sensor 122 (see FIG. 3). The measured rotational speed may be transmitted from the sensor 122 to the WEM 112, by wireline or wireless. The velocity of the vehicle 100 may be measured by another sensor (not illustrated), such as a Hall-effect sensor, the measured velocity being obtainable by the VMM 110 and/or the WEM 112.

The control unit 110, here in the form of the VMM 110 may thus be used for controlling wheel slip of a vehicle, such as the vehicle 100 in FIG. 1. The VMM 110 may be configured to perform the steps of the method according to the above mentioned first aspect of the invention, including any embodiments thereof. Thus, the VMM 110 may be configured to receive a wheel torque request and then, based on the received wheel torque request, the VMM 110 may control the first MSD 116 to provide torque to the wheel in a first mode of operation and to control the second MSD 114 to provide torque to the wheel in a second mode of operation which is different from the first mode of operation, wherein the controlling of the first MSD 116 and the second MSD 114 are, at least temporarily, performed simultaneously.

Figure 4:
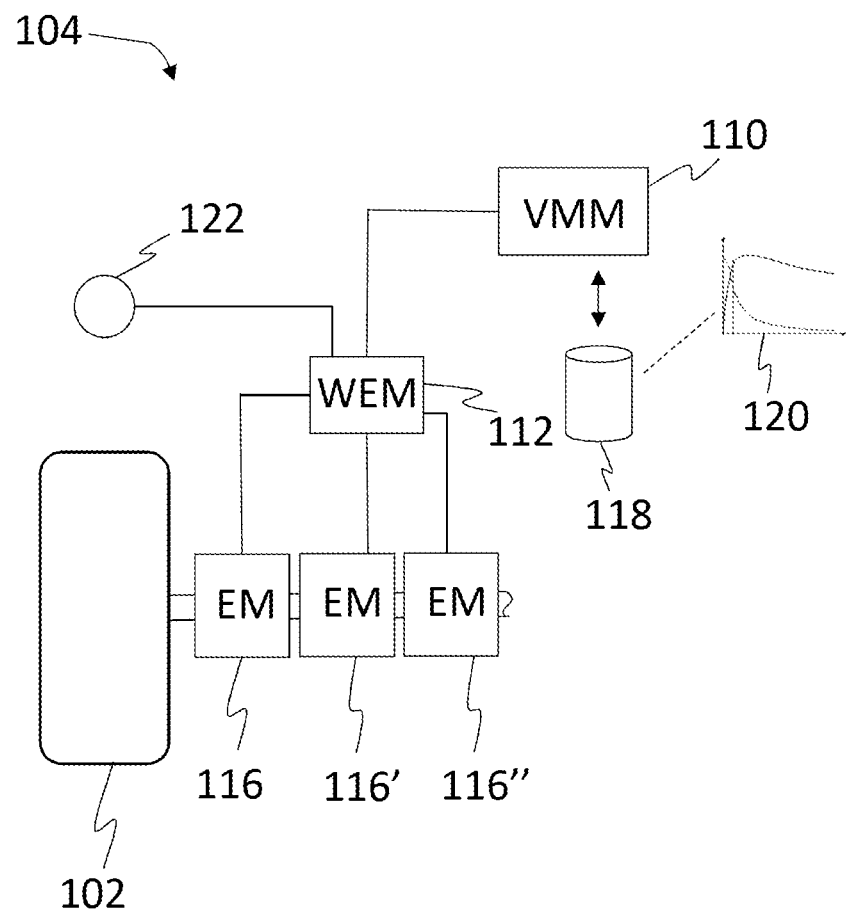
FIG. 4 illustrates another control system in which a control unit according to at least one exemplary embodiment of the invention has been included.

The VMM 110 may, of course, also be implemented in vehicles with other MSD configurations for controlling wheel slip. Such another exemplary configuration is illustrated in FIG. 4, wherein three MSDs 116, 116', 116" are illustrated in the form of a first electric machine (first MSD 116), a second electric machine (second MSD 116') and a third electric machine (third MSD 116"). Thus, in this configuration illustrated in FIG. 4, the VMM 110 may, for instance, control the first MSD 116 to provide torque to the wheel 102 in a first mode of operation, to control the second MSD 116' to provide torque to the wheel 102 in a second mode of operation which is different from the first mode of operation, and to control the third MSD 116" to provide torque to the wheel 102 in either the second or a third mode of operation which is different from both the first and the second modes of operation. The first MSD 116 and at least one of the second MSD 116' and the third MSD 116" may, at least temporarily, be controlled to provide torque simultaneously.

As already explained above, other configurations than the ones illustrated in FIGS. 3 and 4 are of course conceivable, such as a configuration which includes an MSD in the form of an ICE.

The first mode of operation may be a speed control mode. Thus, in the example in FIG. 3, the VMM 110 may thus send a wheel speed request to the first MSD 116 for controlling the rotational speed of the wheel 102. Similarly, in the example in FIG. 4, the VMM 110 may send a wheel speed request to the first MSD 116. As already mentioned, although the first MSD 116 has been illustrated as an electric machine, in other exemplary embodiments it could be an ICE or a brake actuator. For instance, the VMM 110 may send a wheel speed request, e.g. via the WEM 112, so as to control the rotational speed of the wheel 102 by means of a friction brake. In the case of the first MSD being an electric machine or an ICE, the VMM 110 may send either a wheel speed request of a machine speed request. A machine speed request may be used for controlling the rotational speed of the first MSD 116. As explained previously in this disclosure, a control loop based on the machine speed may be more stable than a control loop based on the wheel speed.

The second mode of operation may, in at least some exemplary embodiments, be a torque control mode, wherein the VMM 110 sends a torque request to the second MSD 114, 116' (such as via the WEM 112) for controlling the torque of the second MSD 114, 116'. For instance, in FIG. 3, in which the second MSD 114 is illustrated in the form of a brake actuator, the brake actuator may be controlled to apply a certain torque to the wheel 102 (rather than controlled to obtain a certain wheel speed as discussed in the previous paragraph). In the case of the second MSD 116' being an electric machine such as in FIG. 4 (or an ICE), the control parameter is the torque provided by the electric machine (rather than the rotational speed discussed in the previous paragraph).

The above explained examples are only a few ways in which fighting between MSDs may be avoided, by implementing the present inventive concept. Others being readily conceivable for the skilled person within the scope of the inventive concept.

Figure 5:
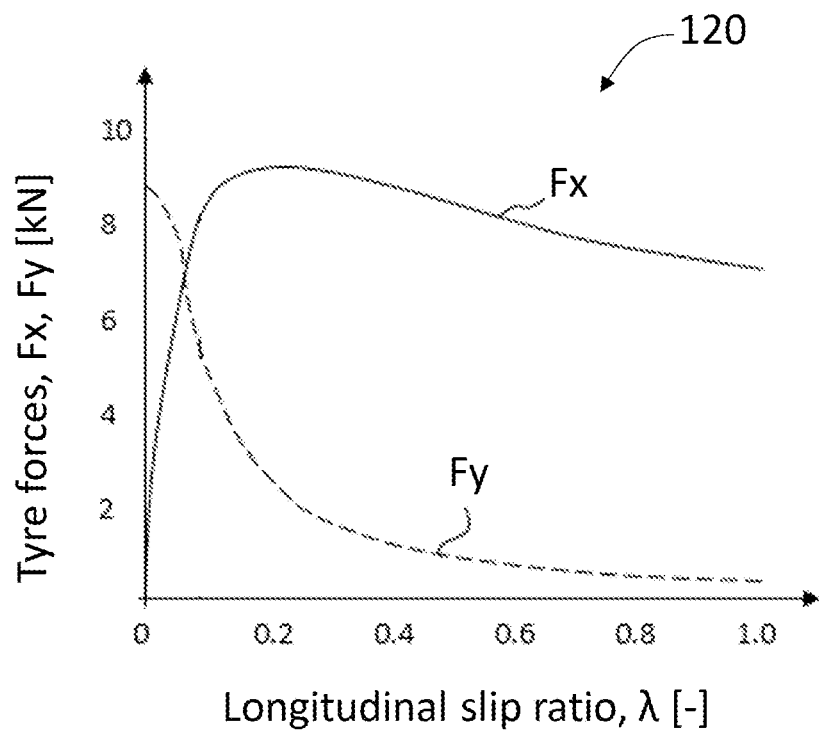
FIG. 5 illustrates an example of a tyre model in which tyre forces are represented as a function of longitudinal wheel slip.

For the above mentioned control of the rotational wheel speed or the control of rotational machine speed, a tyre model 120 may suitably be used, such as exemplified in FIG. 5. As explained, the tyre of the wheel 102 may suitably be provided with a tyre model 120, in which tyre model longitudinal tyre force Fx is represented as at least a function of longitudinal wheel slip A being dependent on rotational speed of the wheel and velocity of the vehicle.

FIG. 5 illustrates an example of a tyre model 120 in which tyre forces are represented as a function of longitudinal wheel slip. The longitudinal tyre force Fx is illustrated by the unbroken curve, while the lateral tyre force Fy is illustrated by the dashed curve. It should be noted that in this connection, longitudinal refers to a radial direction of the wheel 102, specifically the radial direction which is parallel to the road surface and along which the wheel 102 is heading under normal conditions. The term lateral refers to a direction which is parallel to the wheel rotational axis. The longitudinal slip ratio, or simply longitudinal wheel slip, $\lambda$, is unitless, and may be expressed as:

$$\lambda = \frac{R\omega - v_x}{\max(|R\omega|, |v_x|)}$$

where R is the wheel radius in meters, $\omega$ is the angular velocity of the wheel, and $v_x$ is the longitudinal speed of the wheel (in the coordinate system of the wheel). Thus, $\lambda$ is bounded between −1 and 1 and quantifies how much the wheel is slipping with respect to the road surface. During braking, $v_x > R\omega$, and thus the wheel slip is negative. During acceleration, $v_x < R\omega$, and thus the wheel slip is positive. The VMM 110 may maintain/obtain information on $v_x$, (in the reference frame of the wheel), while the speed sensor 122 may be used to determine $\omega$.

The VMM 110 may convert the received wheel torque request to a wheel rotational speed request based on the tyre model 120 stored in the data storage 118. In some exemplary embodiments, the VMM 110 may initially only control the first MSD 116, such that a rotational speed of the wheel 102 corresponding to the wheel rotational speed request is obtained, or such that the achieved rotational speed on the first MSD 116*b* does not reach the wheel rotational speed request and the applied torque is below a specified torque limit. Thus, initially only the first MSD 116 is controlled to provide torque to the wheel 102 in a first mode of operation. The second MSD 114, 116' is initially not controlled to provide torque to the wheel 102 in the second mode of operation.

The VMM 110 may then summarize the values of a selected control parameter present at the MSDs 114, 116, 116', 116" to obtain a summed value. Thus, in the example in FIG. 3 the values of the selected control parameter present at the first MSD 116 and the second MSD 114 are summed, while in the example in FIG. 4 the values of the selected control parameter present at the first MSD 116, the second MSD 116' and the third MSD 116" are summed. The selected control parameter may, for instance, be the torques that are currently present at the different MSDs, or the selected parameter may, for instance, be the powers that are currently delivered by the different MSDs.

The VMM 110 may then divide the summed value between all the MSDs (i.e. in FIG. 3 between the first MSD 116 and the second MSD 114; and in FIG. 4 between the first MSD 116, the second MSD 116' and the third MSD 116") based on a desired value split. Thus, in the case of the selected control parameter being torque, then the division may be based on a desired torque split. In the case of the selected control parameter being power, then the division may be based on a desired power split. The VMM 110 may thus, based on the desired value split, assign a share of the summed value to the second MSD 114 (in FIG. 3); or assign one share of the summed value to the second MSD 116' and another share of the summed value to the third MSD 116" (FIG. 4). Having assigned a share to the second MSD 114, 116' (and third MSD 116"), the VMM 110 may send a parameter request to the second MSD 114, 116' (and third MSD 116") corresponding to its share of the summed value, while the first MSD 116 remains controlled in speed control mode. In case of the selected control parameter being torque, the parameter request may be a torque request. In case of the selected control parameter being power, the parameter request may be a power request.

Thus, according to the above, the VMM 110 may use a tyre model 120 to control the first MSD 116 to operate in a first mode of operation, namely in a speed control mode, and to calculate a parameter request based on current values of a selected control parameter present at the MSDs 114, 116, 116', 116", to control the second MSD 114, 116' (and third MSD 116") in a second (and possibly a third) mode of operation. In this way, the first MSD 116 will be the master, which is used for setting the conditions for the other MSD(s) 114, 116' (116"), the slave(s), the control of the slave MSD(s) being dependent on its/their share of the summed value, which in turn is dependent on the torque applied to the wheel 102 by the first MSD 116 resulting from the speed control mode.

After a period of time, when the system has stabilized again, then the VMM 110 may repeat the sequence of summarizing the values, dividing the summed values, and sending a parameter request to the second MSD 114, 116' (and third MSD 116").

In other exemplary embodiments, the VMM 110 may divide the value of the received wheel torque request between the first MSD 116 and the second MSD 114 based on a desired torque split (FIG. 3), or between the first MSD 116, the second MSD 116' and the third MSD 116" (FIG. 4). The second mode of operation may in such cases be a torque control mode. Similarly, if the third MSD 116" in FIG. 4 is operated in a third mode of operation, it may also be a torque control mode. In either case, the VMM 110 may send a torque request to the second MSD 114, 116' (and to the third MSD 116"). Thus, in contrast to the previous example above, the second and third MSDs 114, 116', 116" do not need to wait for the first MSD 116 to be controlled before they receive their shared value. Instead the second and third MSDs 114, 116', 116" may be assigned their share independently of the first MSD 116. The VMM 110 may therefore send a machine speed request to the first MSD 116 (speed control mode), which is selected based on the tyre model 120 such that the total value of the received wheel torque request is obtained. Thus, in this example, the first MSD 116 may be regarded as slave to the second (and third) MSD(s) 114, 116', 116". In the case of FIG. 3, when the wheel torque request is received by the VMM 110, the capability of the electric machine (first MSD 116) may be taken and subtracted from the total wheel torque request. The VMM 110 may send the remaining torque as a torque request to the brake actuator (second MSD 114). To the electric machine (first MSD 116), the VMM 110 may send the speed request corresponding to the wheel slip A (corresponding to the total torque, via the tyre model 120).

The above are some examples of how fighting between MSDs may be avoided by having one MSD 116 in speed control mode, and the other MSD(s) 114, 116', 116" in a different control mode such as a torque control mode. However, the first and second (and third) modes of operation may also be differentiated by different speed control modes. Thus, the VMM 110 may in at least some exemplary embodiments configure the first MSD 116 as a high bandwidth MSD having relatively short response time control loop and configuring the other MSD(s) 114, 116', 116" as low bandwidth MSD(s) having relatively long response time control loop(s). Furthermore, the first MSD 116 may be configured with a relatively tight deadzone allowing the rotational speed of the first MSD 116 to deviate from the requested rotational speed by a relatively small value before correcting the rotational speed, and configuring the other MSD(s) 114, 116', 116" with a relatively large deadzone allowing the rotational speed of the other MSD(s) 114, 116', 116" to deviate from the requested speed by a relatively large value before correcting the rotational speed. By this differentiation in different modes of operation, i.e. different speed control modes, fighting between the MSDs may be avoided. Suitably, in the example of FIG. 4, the third MSD 116" is not only differentiated from the first MSD 116 as regards bandwidth and/or deadzone, but is also differentiated from the second MSD 116'.

Figure 6:
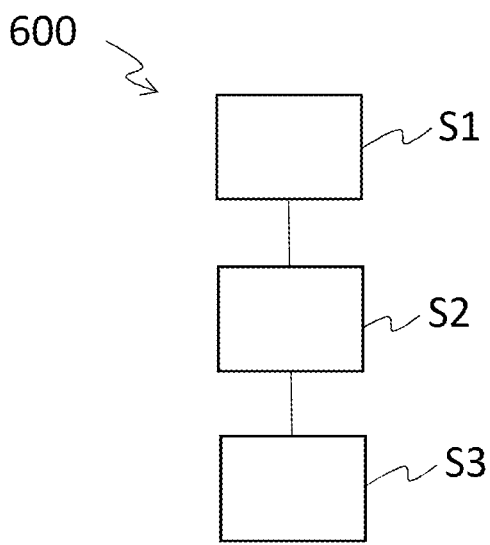
FIG. 6 schematically illustrates a method according to at least one exemplary embodiment of the invention.

FIG. 6 schematically illustrates a method 600 according to at least one exemplary embodiment of the invention. Thus, there is provided a method 600 for controlling wheel slip of a vehicle, wherein the vehicle comprises at least a first and a second motion support device, MSD, for providing torque to a common wheel of the vehicle, the method comprising:
in a step S1, receiving a wheel torque request, and based on the received wheel torque request:
in a step S2, controlling the first MSD to provide torque to the wheel in a first mode of operation, and in a step S3, controlling the second MSD to provide torque to the wheel in a second mode of operation which is different from the first mode of operation, wherein said controlling of the first MSD and said controlling of the second MSD are, at least temporarily, performed simultaneously.

As can be readily understood from the previous discussions, in some exemplary embodiments step S2 may be initiated before step S3, in other exemplary embodiments step S3 may be initiated before step S2, and in further exemplary embodiments, steps S2 and S3 may be initiated simultaneously.

Figure 7:
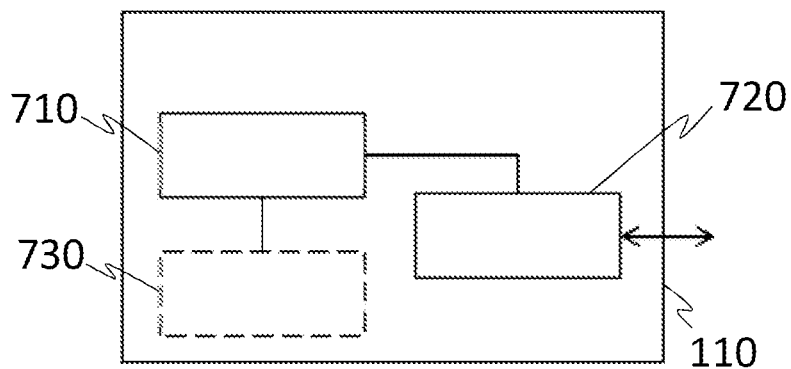
FIG. 7 schematically illustrates a control unit according to at least one exemplary embodiment of the invention.

FIG. 7 schematically illustrates a control unit 110 according to at least one exemplary embodiment of the invention. In particular, FIG. 7 illustrates, in terms of a number of functional units, the components of a control unit 110 according to exemplary embodiments of the discussions herein. The control unit 110 may be comprised in the vehicle 100, e.g. in the form of a VMM unit. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 110 to perform a set of operations, or steps, such as the method discussed in connection to FIG. 6 and exemplary embodiments thereof discussed throughout this disclosure. For example, the storage medium 730 may store the set of operations, and the processing circuitry 710 may be configured to retrieve the set of operations from the storage medium 730 to cause the control unit 110 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The control unit may 110 further comprise an interface 720 for communications with at least one external device such as other controller(s) providing inputs/requests. As such, the interface 720 may comprise one or more transmitters and receivers, comprising analogue and digital components and a suitable number of ports for wireline or wireless communication.

The processing circuitry 710 controls the general operation of the control unit 110, e.g. by sending data and control signals to the interface 720 and the storage medium 730, by receiving data and reports from the interface 720, and by retrieving data and instructions form the storage medium 730. Other components, as well as the related functionality, of the control unit 110 are omitted in order not to obscure the concepts presented herein.

Figure 8:
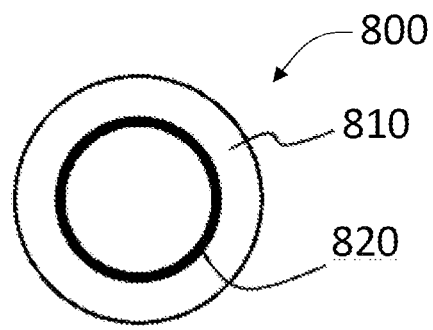
FIG. 8 schematically illustrates a computer program product according to at least one exemplary embodiment of the invention.

FIG. 8 schematically illustrates a computer program product 800 according to at least one exemplary embodiment of the invention. More specifically, FIG. 8 illustrates a computer readable medium 810 carrying a computer program comprising program code means 820 for performing the methods exemplified in FIG. 6, when said program product is run on a computer. The computer readable medium 810 and the program code means 820 may together form the computer program product 800.

The invention claimed is:

1. A method for controlling wheel slip of a vehicle, wherein the vehicle comprises at least a first and a second motion support device ("MSD") for providing torque to a common wheel of the vehicle, the method comprising:
receiving a wheel torque request as a received wheel torque request,
based on the received wheel torque request:
controlling the first MSD to provide torque to the wheel in a first mode of operation, wherein said first mode of operation is a speed control mode,
controlling the second MSD to provide torque to the wheel in a second mode of operation which is different from the first mode of operation, wherein said second mode of operation is a torque control mode,
sending a wheel speed request to the first MSD for controlling the rotational speed of the wheel,
sending a torque request to the second MSD for controlling the torque of the second MSD, wherein said controlling of the first MSD and said controlling of the second MSD are, at least temporarily, performed simultaneously.

2. The method according to claim 1, wherein the first MSD is an electric machine or an internal combustion engine, ICE, wherein said first mode of operation is a speed control mode, wherein the method comprises sending a machine speed request to the first MSD for controlling the rotational speed of the first MSD.

3. The method according to claim 1, wherein the wheel is provided with a tire for which a tire model is provided, wherein, in the tire model, longitudinal tire force is represented as at least a function of longitudinal wheel slip, longitudinal wheel slip being dependent on rotational speed of the wheel and velocity of the vehicle, wherein the method comprises controlling the rotational speed based on said tire model.

4. The method according to claim 3, further comprising converting the received wheel torque request to a wheel rotational speed request based on the tire model,
initially only controlling the first MSD, such that a rotational speed of the wheel corresponding to the wheel rotational speed request is obtained or such that the achieved rotational speed on the first MSD does not reach the wheel rotational speed request and the applied torque is below a specified torque limit, thereafter
summing the values of a selected control parameter present at the MSDs to obtain a summed value,
dividing the summed value between the MSDs based on a desired value split to assign a share of the summed value to the second MSD, and
sending a parameter request to the second MSD corresponding to its share of the summed value, while the first MSD remains controlled in speed control mode.

5. The method according to claim 4, wherein said selected control parameter is torque, wherein said summarizing, dividing and sending comprises:
summing the current torques present at the MSDs to obtain a summed value,
dividing the summed value between the MSDs based on a desired torque split to assign a share of the summed value to the second MSD, and
sending a torque request to the second MSD corresponding to its share of the summed value, while the first MSD remains controlled in speed control mode.

6. The method according to claim 4, wherein said selected control parameter is power, wherein said summarizing, dividing and sending comprises:
summing the current powers delivered by the MSDs to obtain a summed value,
dividing the summed value between the MSDs based on a desired power split to assign a share of the summed value to the second MSD, and
sending a power request to the second MSD corresponding to its share of the summed value, while the first MSD remains controlled in speed control mode.

7. The method according to claim 4, comprising, after a period of time, repeating said sequence of summing the values, dividing the summed values, and sending a parameter request to the second MSD.

8. The method according to claim 3, comprising dividing the value of the received wheel torque request between the first and the second MSDs based on a desired torque split, wherein said second mode of operation is a torque control mode, wherein the method comprises sending a torque request to the second MSD, wherein the first mode of operation is a speed control mode, wherein the method comprises sending a machine speed request to the first MSD, which machine speed request is selected based on the tire model so as to provide the total value of the received wheel torque request.

9. The method according to claim 1, wherein said second mode of operation is a speed control mode which is different from the speed control mode of the first MSD, wherein the method comprises configuring the first MSD as a high bandwidth MSD having relatively short response time control loop(s), and configuring the second MSD as a low bandwidth MSD having relatively long response time control loop(s).

10. The method according to claim 1, comprising configuring the first MSD with a relatively tight deadzone allowing the rotational speed of the first MSD to deviate from the requested rotational speed by a relatively small value before correcting the rotational speed, and configuring the second MSD with a relatively large deadzone allowing the rotational speed of the second MSD to deviate from the requested speed by a relatively large value before correcting the rotational speed.

11. The method according to claim 1, wherein the vehicle comprises a third MSD, for providing torque to said wheel, the method comprising controlling the third MSD in said second mode of operation, or in a third mode of operation which is different from the first and second modes of operation.

12. A non-transitory computer readable medium carrying a computer program comprising program code for, when said program product is run on a computer:
receiving a wheel torque request as a received wheel torque request,
based on the received wheel torque request:
controlling a first MSD to provide torque to the wheel in a first mode of operation, wherein said first mode of operation is a speed control mode,
controlling a second MSD to provide torque to the wheel in a second mode of operation which is different from the first mode of operation, wherein said second mode of operation is a torque control mode,
sending a wheel speed request to the first MSD for controlling the rotational speed of the wheel,
sending a torque request to the second MSD for controlling the torque of the second MSD, wherein said controlling of the first MSD and said controlling of the second MSD are, at least temporarily, performed simultaneously.

13. A control unit for controlling wheel slip of a vehicle, wherein the vehicle comprises at least a first and a second motion support device, MSD, for providing torque to a common wheel of the vehicle, the control unit being configured to:
receiving a wheel torque request as a received wheel torque request,
based on the received wheel torque request:
controlling the first MSD to provide torque to the wheel in a first mode of operation, wherein said first mode of operation is a speed control mode,
controlling the second MSD to provide torque to the wheel in a second mode of operation which is different from the first mode of operation, wherein said second mode of operation is a torque control mode,
sending a wheel speed request to the first MSD for controlling the rotational speed of the wheel,
sending a torque request to the second MSD for controlling the torque of the second MSD,
wherein said controlling of the first MSD and said controlling of the second MSD are, at least temporarily, performed simultaneously.

14. A vehicle comprising a control unit configured to:
receive a wheel torque request as a received wheel torque request,
based on the received wheel torque request:
control a first MSD to provide torque to the wheel in a first mode of operation, wherein said first mode of operation is a speed control mode,
control a second MSD to provide torque to the wheel in a second mode of operation which is different from the first mode of operation, wherein said second mode of operation is a torque control mode,
send a wheel speed request to the first MSD for controlling the rotational speed of the wheel,
send a torque request to the second MSD for controlling the torque of the second MSD, wherein said controlling of the first MSD and said controlling of the second MSD are, at least temporarily, performed simultaneously, wherein said first MSD is one of an electric machine, an ICE, and a brake actuator, wherein said second MSD is one of an electric machine and a brake actuator.

15. A method for controlling wheel slip of a vehicle, wherein the vehicle comprises at least a first and a second motion support device ("MSD") for providing torque to a common wheel of the vehicle,
the method comprising:
receiving a wheel torque request as a received wheel torque request,
based on the received wheel torque request:
controlling the first MSD to provide torque to the wheel in a first mode of operation, wherein said first mode of operation is a speed control mode,
controlling the second MSD to provide torque to the wheel in a second mode of operation which is different from the first mode of operation,
said controlling of the second MSD are, at least temporarily, performed simultaneously,
wherein the wheel is provided with a tire for which a tire model is provided, wherein, in the tire model, longitudinal tire force is represented as at least a function of longitudinal wheel slip, longitudinal wheel slip being dependent on rotational speed of the wheel and velocity of the vehicle, sending a wheel speed request to the first MSD for controlling the rotational speed of the wheel based on said tire model, wherein said controlling of the first MSD, converting the received wheel torque request to a wheel rotational speed request based on the tire model, initially only controlling the first MSD, such that a rotational speed of the wheel corresponding to the wheel rotational speed request is obtained or such that the achieved rotational speed on the first MSD does not reach the wheel rotational speed request and the applied torque is below a specified torque limit, thereafter summing the values of a selected control parameter present at the MSDs to obtain a summed value, dividing the summed value between the MSDs based on a desired value split to assign a share of the summed value to the second MSD, and sending a parameter request to the second MSD corresponding to its share of the summed value, while the first MSD remains controlled in speed control mode.

* * * * *